(12) United States Patent
Amble et al.

(10) Patent No.: US 11,415,321 B2
(45) Date of Patent: Aug. 16, 2022

(54) COMBUSTOR LINER FOR A GAS TURBINE ENGINE AND AN ASSOCIATED METHOD THEREOF

(71) Applicant: GENERAL ELECTRIC COMPANY, Schenectady, NY (US)

(72) Inventors: Mayank Krisna Amble, Bangalore (IN); Perumallu Vukanti, Bangalore (IN); Steven Clayton Vise, Loveland, OH (US); Michael Anthony Benjamin, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/029,587

(22) Filed: Sep. 23, 2020

(65) Prior Publication Data
US 2021/0003281 A1    Jan. 7, 2021

Related U.S. Application Data

(62) Division of application No. 15/823,633, filed on Nov. 28, 2017, now Pat. No. 10,816,202.

(51) Int. Cl.
*F23R 3/06*    (2006.01)
*F23R 3/00*    (2006.01)
(Continued)

(52) U.S. Cl.
CPC .................. *F23R 3/06* (2013.01); *F02C 7/18* (2013.01); *F02K 1/822* (2013.01); *F23R 3/002* (2013.01);
(Continued)

(58) Field of Classification Search
CPC .. F02C 7/18; F02K 1/822; F23R 3/002; F23R 3/04; F23R 3/06; F23R 3/10
See application file for complete search history.

(56) References Cited

U.S. PATENT DOCUMENTS 5,239,818 A * 8/1993 Stickles .................... F23R 3/04
                                                      60/737
5,261,223 A * 11/1993 Foltz ....................... F23R 3/002
                                                      60/757
(Continued)

FOREIGN PATENT DOCUMENTS

FR    2948987 A1    2/2011
FR    2958012 A1    9/2011
(Continued)

*Primary Examiner* — Craig Kim
(74) *Attorney, Agent, or Firm* — Venable LLP; Peter T. Hrubiec; Michele V. Frank

(57) ABSTRACT

A method for regulating jet wakes in a combustor including: directing compressed fluid into a passageway between a casing and a combustor liner; directing a combustion gas along a combustion zone; discharging a first portion of compressed fluid from the passageway into the combustion zone via a first through-hole which is disposed on a section of a combustor panel in a first circumferential row; and discharging a second portion of the compressed fluid from the passageway into the combustion zone via second through-holes, wherein the second through-holes are disposed on a section of the panel, spaced apart axially and circumferentially, and adjacent to the first through-hole, wherein the second through-holes include a first set of through-holes and a second set of through-holes, the first set of through-holes in a second row and the second set of through-holes in a third row, wherein the second and third rows extend circumferentially.

15 Claims, 11 Drawing Sheets

(51) Int. Cl.
*F23R 3/26* (2006.01)
*F02K 1/82* (2006.01)
*F02C 7/18* (2006.01)
*F02C 3/04* (2006.01)

(52) U.S. Cl.
CPC ............... *F23R 3/26* (2013.01); *F02C 3/04* (2013.01); *F05D 2220/32* (2013.01); *F05D 2240/35* (2013.01)

(56) References Cited

U.S. PATENT DOCUMENTS

| | | | | |
|---|---|---|---|---|
| 5,289,686 | A * | 3/1994 | Razdan | F16K 3/06 60/755 |
| 5,297,385 | A | 3/1994 | Dubell et al. | |
| 5,481,867 | A | 1/1996 | Dubell et al. | |
| 5,934,067 | A | 8/1999 | Ansart et al. | |
| 6,070,412 | A * | 6/2000 | Ansart | F23R 3/06 60/746 |
| 6,101,814 | A | 8/2000 | Hoke et al. | |
| 6,279,323 | B1 | 8/2001 | Monty et al. | |
| 6,408,629 | B1 * | 6/2002 | Harris | F23R 3/06 60/754 |
| 6,513,331 | B1 * | 2/2003 | Brown | F23R 3/06 60/754 |
| 7,093,439 | B2 | 8/2006 | Pacheco-Tougas | F23R 3/06 60/754 |
| 7,891,194 | B2 | 2/2011 | Biebel et al. | |
| 8,028,529 | B2 * | 10/2011 | Venkataraman | F23R 3/06 165/169 |
| 8,387,397 | B2 | 3/2013 | Chen et al. | |
| 9,175,856 | B2 * | 11/2015 | Sandelis | F23R 3/50 |
| 10,358,940 | B2 * | 7/2019 | Lastrina | F01D 5/085 |
| 10,551,064 | B2 * | 2/2020 | Rullaud | F23R 3/002 |
| 10,697,636 | B2 * | 6/2020 | Cunha | F02C 3/04 |
| 2002/0108374 | A1 | 8/2002 | Young et al. | |
| 2002/0116929 | A1 * | 8/2002 | Snyder | F23R 3/002 60/740 |
| 2003/0177769 | A1 | 9/2003 | Graves et al. | |
| 2003/0213250 | A1 * | 11/2003 | Pacheco-Tougas | F23R 3/60 60/752 |
| 2005/0081526 | A1 * | 4/2005 | Howell | F23R 3/002 60/752 |
| 2006/0130486 | A1 * | 6/2006 | Danis | F23R 3/002 60/752 |
| 2007/0084219 | A1 * | 4/2007 | Bernier | F23R 3/06 60/752 |
| 2007/0193248 | A1 * | 8/2007 | Bessagnet | F23R 3/06 60/39.01 |
| 2007/0227149 | A1 | 10/2007 | Biebel et al. | |
| 2008/0010992 | A1 * | 1/2008 | Patterson | F23R 3/06 60/752 |
| 2008/0127651 | A1 * | 6/2008 | Zupanc | F23R 3/50 60/752 |
| 2008/0264064 | A1 * | 10/2008 | Sze | F23R 3/002 60/752 |
| 2009/0003998 | A1 | 1/2009 | Woodcock et al. | |
| 2009/0100839 | A1 | 4/2009 | Cazalens et al. | |
| 2009/0100840 | A1 * | 4/2009 | Campion | F23R 3/06 60/754 |
| 2009/0120095 | A1 | 5/2009 | Berry et al. | |
| 2009/0139239 | A1 * | 6/2009 | Zupanc | F23R 3/06 60/740 |
| 2009/0308077 | A1 | 12/2009 | Shelley et al. | |
| 2010/0077763 | A1 * | 4/2010 | Alkabie | F23R 3/54 60/754 |
| 2010/0095679 | A1 | 4/2010 | Rudrapatna et al. | |
| 2010/0095680 | A1 | 4/2010 | Rudrapatna et al. | |
| 2010/0122537 | A1 | 5/2010 | Yankowich et al. | |
| 2010/0218503 | A1 * | 9/2010 | Bronson | F23R 3/50 60/754 |
| 2010/0218504 | A1 * | 9/2010 | Bronson | F23R 3/50 60/754 |
| 2010/0242483 | A1 * | 9/2010 | Snyder | F23R 3/06 60/757 |
| 2010/0287941 | A1 | 11/2010 | Kim et al. | |
| 2011/0023495 | A1 | 2/2011 | Bronson et al. | |
| 2011/0048024 | A1 * | 3/2011 | Snyder | F23R 3/50 60/754 |
| 2011/0120134 | A1 | 5/2011 | Hoke et al. | |
| 2011/0185736 | A1 | 8/2011 | McKinney | |
| 2011/0219774 | A1 * | 9/2011 | Bronson | F23R 3/50 60/752 |
| 2011/0271678 | A1 | 11/2011 | Bourgois et al. | |
| 2012/0017596 | A1 | 1/2012 | Rudrapatna et al. | |
| 2012/0137697 | A1 * | 6/2012 | Sandelis | F23R 3/50 60/752 |
| 2012/0186222 | A1 * | 7/2012 | Commaret | F23R 3/26 60/39.827 |
| 2012/0240584 | A1 | 9/2012 | Berdou et al. | |
| 2012/0291442 | A1 * | 11/2012 | Commaret | F23R 3/10 60/754 |
| 2012/0297778 | A1 | 11/2012 | Rudrapatna et al. | |
| 2012/0304647 | A1 | 12/2012 | Dudebout et al. | |
| 2013/0340437 | A1 * | 12/2013 | Erbas-Sen | F23R 3/10 60/754 |
| 2016/0025006 | A1 | 1/2016 | Propheter-Hinckley et al. | |
| 2016/0131365 | A1 | 5/2016 | Tu et al. | |
| 2016/0169512 | A1 * | 6/2016 | Tu | F23R 3/06 60/754 |
| 2016/0169515 | A1 | 6/2016 | Tu et al. | |
| 2016/0186998 | A1 | 6/2016 | Kostka, Jr. et al. | |
| 2016/0237896 | A1 * | 8/2016 | Leglaye | F23R 3/04 |
| 2016/0265777 | A1 | 9/2016 | Hoke et al. | |
| 2016/0370007 | A1 | 12/2016 | Hongoh | |
| 2018/0100650 | A1 * | 4/2018 | Clemen | F23R 3/002 |
| 2021/0376344 | A1 * | 12/2021 | Toida | H01M 8/04231 |
| 2022/0099025 | A1 * | 3/2022 | Carrotte | F23K 5/22 |

FOREIGN PATENT DOCUMENTS

| | | |
|---|---|---|
| FR | 2973479 A1 | 10/2012 |
| FR | 2982009 A1 | 5/2013 |
| WO | 2012114030 A1 | 8/2012 |

\* cited by examiner

COMBUSTOR LINER FOR A GAS TURBINE ENGINE AND AN ASSOCIATED METHOD THEREOF

BACKGROUND

Embodiments of this disclosure relate to combustors, and more specifically to a combustor liner and associated methods for regulating jet wakes in the combustors.

Gas turbine engines include a compressor for compressing air, which is later mixed with fuel and channeled to a combustor where the mixture of the fuel and air is ignited for generating hot combustion gas. A combustor includes a combustor liner for directing the combustion gas to a turbine, which extracts energy from the combustion gas for powering the compressor as well as producing useful work, for example, to propel an aircraft. The combustor liner typically includes a plurality of panels that are coupled to each other to define a combustion chamber therebetween the plurality of panels. Each of the plurality of panels includes a plurality of openings to inject the compressed air into the combustion chamber for facilitating oxidation of unburnt fuel in the combustion gas in the combustion chamber. The injection of the compressed air from the plurality of openings into the combustion chamber may form a low-pressure area behind each of the plurality of openings. Thus, resulting in drawing the hot combustion gas into the low-pressure area, thereby leaving jet wakes on the panel behind each of the plurality of openings. The jet wakes may result in producing hot spots on the panel and NOx producing zones. Further, the hot spots may increase temperature of the combustion chamber, thus reducing service life of the combustor liner. Further, the increase in temperature of the combustion chamber may also lead to increase in NOx emissions. Accordingly, there is a need for an improved combustor and an associated method for regulating jet wakes in the combustor.

BRIEF DESCRIPTION

In accordance with one example embodiment, a method for regulating jet wakes in a combustor includes: directing a portion of a compressed fluid from a compressor into a passageway defined between a casing and a combustor liner of the combustor; directing a combustion gas along an annular combustion zone defined by a panel of the combustor liner; discharging a first sub-portion of the portion of the compressed fluid from the passageway into the annular combustion zone via at least one first through-hole to aid in further combustion of an unburned portion of the combustion gas, wherein the at least one first through-hole is disposed on at least a section of the panel in a first row extending along a circumferential direction; and discharging a second sub-portion of the portion of the compressed fluid from the passageway into the annular combustion zone via a plurality of second through-holes to distribute the second sub-portion around a circumferential plane of the section of the panel collectively covered by the at least one first through-hole and the plurality of second through-holes, and purging out the jet wakes, wherein the plurality of second through-holes is disposed on the section of the panel, spaced apart from each other along an axial direction and the circumferential direction, and arranged adjacent to the at least one first through-hole, wherein the plurality of second through-holes comprises a first set of through-holes and a second set of through-holes, wherein the first set of through-holes is arranged in a second row and the second set of through-holes is arranged in a third row different from the second row, and wherein the second and third rows extend along the circumferential direction.

DRAWINGS

These and other features, and aspects of embodiments of the disclosure will become better understood when the following detailed description is read with reference to the accompanying drawings in which like characters represent like parts throughout the drawings, unless specifically recited otherwise, wherein.

DETAILED DESCRIPTION

Figure 1:
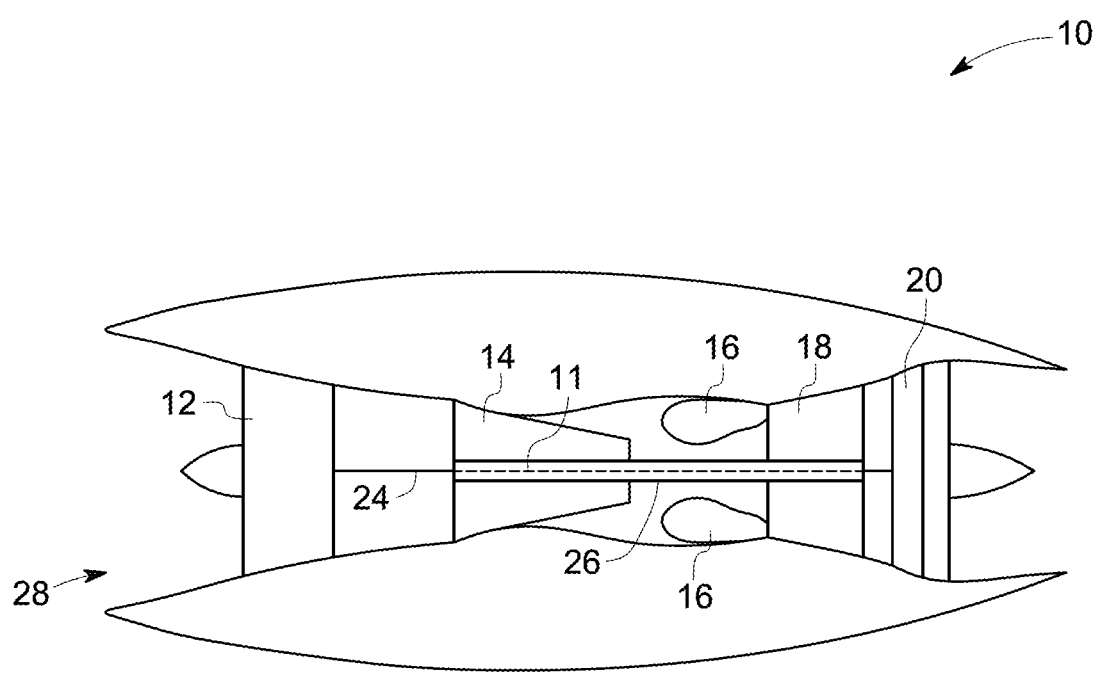
FIG. 1 is a schematic diagram of a gas turbine engine in accordance with one example embodiment of the present disclosure.

To more clearly and concisely describe and point out the subject matter, the following definitions are provided for specific terms, which are used throughout the following description and the appended claims, unless specifically denoted otherwise with respect to a particular embodiment. The term "circumferential plane" as used in the context refers to an inner surface of a panel of a combustor liner, extended along a circumferential direction of a gas turbine engine. The term "through-hole" as used in the context refers to a hole extending between the outer and inner surfaces of a panel of the combustor. The term "overlap" as used in the context refers to the extension of one object over another object. For example, a reference of a second row overlapping with a first row means that the second row extends over the first row. The term "through-hole(s) disposed in a row on a panel" as used in the context refers to positioning of the through-hole(s) on the panel such that the row encompasses the through-hole(s) positioned on the panel. For example, when two or more circular through-holes are disposed in a row on a panel, the width of the row is slightly more than the diameter of the largest circular through-hole such that the row encompasses all the circular through-holes. The term "major axis of a through-hole" as used in the context refers to a longer axis of a through-hole, for example, longer axis of an elliptical through-hole or a race-track through-hole, passing through its foci. Similarly, the term "minor axis of a through-hole" as used in the context refers to a shorter axis of a through-hole such as shorter axis of an elliptical through-hole or a race-track through-hole, which is perpendicular to its major axis. The term "around a circumferential plane" as used in the context refers to encircling the circumferential plane. The term "section of a panel" as used in the context refers to a portion of the panel. The section of a panel may extend up to 360 degrees along the circumferential direction or circumferentially. For example, in some embodiments, "a section of the panel" may refer to a portion of the panel extended circumferentially in a range from 5 degrees to 10 degrees. In some other embodiments, when the section of the annular panel is extended to 360 degrees, it is constituted, and referred as, the "entire panel". The term "operatively coupled" as used in the context refers to connecting at least two components to each other such that they function together in a mutually compatible manner to perform an intended operation. For example, a compressor may be connected to a combustor via a diffuser assembly such that the diffuser assembly directs the compressed fluid discharged from the compressor to the combustor via the diffuser assembly. The term "hydraulic diameter" as used in the context refers to ratio of area of a component to four times a perimeter of the component.

Embodiments of the present disclosure discussed herein relate to a combustor liner for a combustor deployed in a turbomachine, such as a gas turbine engine. The combustor liner includes a panel, at least one first through-hole, and a plurality of second through-holes. The panel is an annular combustion chamber defining an annular combustion zone of the combustor. The at least one first through-hole is disposed on a section of the panel in a first row extending along the circumferential direction of the gas turbine engine. The plurality of second through-holes is disposed on the section of the panel, spaced apart from each other along the circumferential direction and an axial direction of the gas turbine engine, and arranged adjacent to the at least one first through-hole. In some embodiments, the plurality of second through-holes includes a first set of through-holes and a second set of through-holes. The first set of through-holes is arranged in a second row and the second set of through-holes is arranged in a third row different from the second row. The second and third set of through-holes are spaced apart from each other along the axial direction of the gas turbine engine. Further, the first and second set of through-holes may have characteristics, for example, shape, size, orientation and the like, that are mutually exclusive from one another. The second and third rows extend along the circumferential direction. Further, the at least one first through-hole and the plurality of second through-holes are configured to collectively cover a circumferential plane of the section of the panel along the first, second, and third rows. It should be noted herein that the term "configured to collectively cover a circumferential plane" as used in the context herein refers to "arrangement" of the at least one first through-hole and the plurality of second through-holes on the section of the panel or on an entire panel, in one or more predefined ways as discussed herein, to cover the circumferential plane of the section of the panel or the entire panel respectively. In some embodiments, the second row overlaps with the first row. In other words, the second row circumferentially overlaps the first row. In some other embodiments, at least one of the second row or the third row partially overlaps with the first row. In some example embodiments, a distance, for example an axial distance and/or a circumferential distance between the at least one first through-hole and the mutually adjacent second through-hole of the plurality of second through-holes is greater than 0.08 inches. It should be noted herein that the term "circumferential distance" may refer to distance measured along the circumferential direction of gas turbine engine. Similarly, the term "axial distance" may refer to distance measured along the axial direction of gas turbine engine. In one example embodiment, a circumferential distance between mutually adjacent through-holes of the plurality of second through-holes is greater than 0.08 inches. For example, the circumferential distance between a mutually adjacent through-hole of the first set of through-holes and/or the second set of through-holes is greater than 0.08 inches. Similarly, an axial distance between the mutually adjacent through-holes of the plurality of second through-holes is greater than 0.08 inches. In other words, the axial distance between the mutually adjacent through-holes of the first set of through-holes or the second set of through-holes is greater than 0.08 inches. In some embodiments, an axial distance between the at least one first through-hole and a mutually adjacent second through-hole of the plurality of second through-holes is greater than 0.08 inches.

The gas turbine engine further includes a compressor and a combustor operatively coupled to each other. The combustor includes a casing and a combustor liner disposed within the casing to define a passageway therebetween the casing and the combustor liner. The compressor is configured to supply the compressed fluid to the combustion chamber and to the passageway. The combustion chamber may be used for i) ignition of a mixture of fuel and the compressed fluid and ii) directing the combustion gas to the turbine. In some embodiments, the at least one first through-hole is used for discharging a first sub-portion of the portion of the compressed fluid from the passageway into the annular combustion zone to aid in combustion of an unburned portion of the combustion gas in the combustion chamber. The plurality of second through-holes is used for discharging a second sub-portion of the portion of the compressed fluid from the passageway into the annular combustion zone for distributing the second sub-portion of the compressed fluid around the circumferential plane of the section of the panel collectively covered by the at least one first through-hole and the plurality of second through-holes, and purging out the jet wakes. Thus, the plurality of second through-holes is used to regulate jet wakes and production of hot spots therefrom on the section of the panel, thereby preventing overheating of the combustion chamber, and increasing service life of the combustor chamber. In certain embodiments, the plurality of second through-holes may be used for discharging the second sub-portion of the compressed fluid to further regulate emission (e.g., NOx producing zones) from the combustion gas by moving a portion of the combustion gas dispersed around the at least one first through-hole to the annular combustion zone, for example, towards a center line axis of the combustion chamber. The first and second sub-portions of the compressed fluid may also be used for regulating an inner spatial temperature of the section of the panel along the circumferential plane.

FIG. 1 illustrates a schematic view of a gas turbine engine 10 in accordance with one example embodiment. The gas turbine engine 10 includes a compressor (such as a low-pressure compressor 12 and a high-pressure compressor 14), a combustor 16, and a turbine (such as a high-pressure turbine 18 and a low-pressure turbine 20) arranged in a serial, axial flow relationship along an axis 11 of the gas turbine engine 10. In some embodiments, the low-pressure compressor 12 and the low-pressure turbine 20 are coupled to each other via a first shaft 24, and the high-pressure compressor 14 and the high-pressure turbine 18 are coupled to each other via a second shaft 26. Further, the combustor 16 is operatively coupled to the high-pressure compressor 14 and the high-pressure turbine 18. It should be noted herein that the term "operatively coupled" as used in the context, is not limited to a direct mechanical, electrical, and/or a fluid communication between components, but may also include an indirect mechanical, electrical, and/or fluid communication between multiple components. In one embodiment, the combustor 16 may include a casing and a combustion liner (not shown) disposed within the casing to define a passageway (not shown) therebetween the casing and the combustor liner. In such embodiments, the combustion liner includes a panel, at least one first through-hole disposed on a section of the panel, and a plurality of second through-holes disposed on the section of the panel and adjacent to the at least one first through-hole. The combustor 16 of the present disclosure is discussed in greater detail below.

During operation, the low-pressure compressor 12 is configured to receive fluid, for example, air from an upstream side 28 of gas turbine engine 10 and increase pressure of the fluid to generate a compressed fluid. The high-pressure compressor 14 is configured to receive the compressed fluid from the low-pressure compressor 12 and further increase pressure of the compressed fluid. In some embodiments, a portion of the compressed fluid is directed to the passageway from the compressor and another portion of the compressed fluid is directed to the combustor 16 from the high-pressure compressor 14. The portion of the compressed fluid that is directed to the combustor 16 is mixed with fuel and ignited at a combustion zone to generate combustion gas. The portion of the compressed fluid that is directed to the passageway may further be directed to the combustion zone via the first and second through-holes. In one example embodiment, the at least one first through-hole may be configured to discharge a first sub-portion of the portion of the compressed fluid from the passageway into the combustion zone of the combustor 16 to aid in further ignition (or combustion) of an unburned portion of the combustion gas. It should be noted herein that the step of "discharging the first sub-portion of the compressed fluid into the combustion zone via the at least one first through-hole" may result in formation of jet wakes on the section of the panel, for example, behind or aft region of the at least one through-hole. In such example embodiments, the plurality of second through-holes are disposed in such manner that they discharge a second sub-portion of the portion of the compressed fluid from the passageway into the combustion zone for distributing the second sub-portion of the portion of the compressed fluid around the circumferential plane of the section of the panel for purging out the jet wakes. The method for regulating the jet wakes along the combustor liner, is discussed in greater detail below. The combustion gas generated in the combustor 16 is then directed to the turbine to drive the high-pressure turbine 18 and/or the low-pressure turbine 20. The term "portion of the compressed fluid" used in the combustion zone 50 refers to a sum of the first sub-portion and the second portion of the compressed fluid. The term "first sub-portion" as used in the context refers to a ratio of the compressed fluid that is discharged into the combustion zone to the portion of the compressed fluid. In some embodiments, the first sub-portion is at least 50 percent of the portion of the compressed fluid. The term "second sub-portion" as used in the context refers to a ratio of the compressed fluid that is discharged into the combustion zone to the portion of the compressed fluid.

Figure 2:
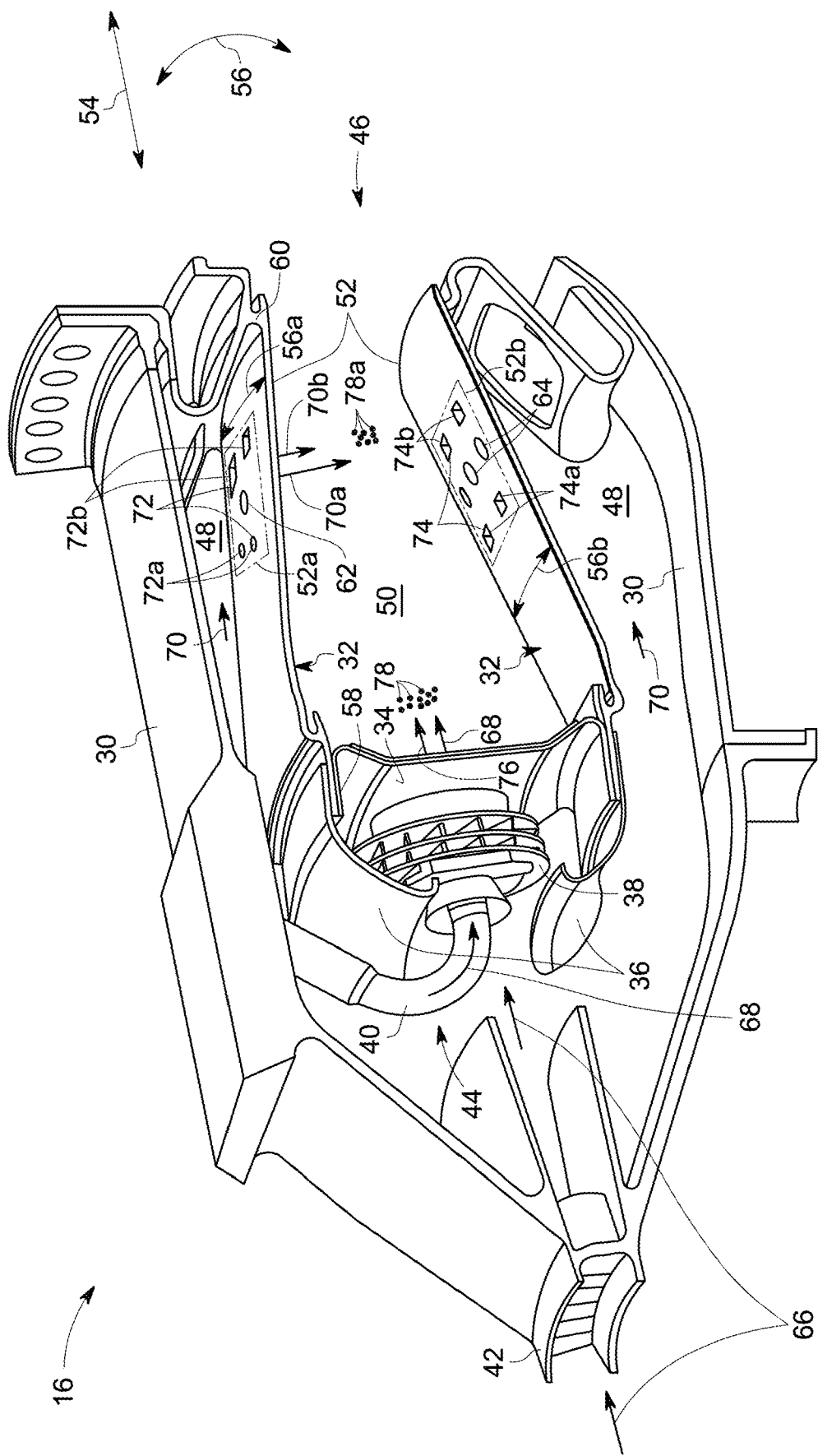
FIG. 2 is a schematic cross-sectional view of a portion of the combustor in accordance with one example embodiment of the present disclosure.

FIG. 2 illustrates a schematic cross-sectional view of a portion of the combustor 16 in accordance with one example embodiment of the present disclosure. In the illustrated embodiment, the portion of the combustor 16 includes a casing 30, a combustor liner 32, a dome assembly 34, a cowl assembly 36, a swirler assembly 38, and a fuel flowline 40. The combustor 16 is operatively coupled to a compressor via a compressor diffuser nozzle 42 and to a turbine (not shown in FIG. 2). In one example embodiment, an upstream end 44 of the combustor 16 is operatively coupled to the compressor and a downstream end 46 of the combustor 16 is operatively coupled to the turbine. The combustor liner 32 is disposed within the casing 30 to define a passageway 48 therebetween the casing 30 and the combustor liner 32. The dome assembly 34 is disposed at the upstream end 44 of the combustor 16 and includes an opening (not labeled) for receiving and holding the swirler assembly 38. The swirler assembly 38 also includes an opening for receiving and holding the fuel flowline 40. In some embodiments, the fuel flowline 40 is further coupled to a fuel source disposed outside the casing 30 and configured to receive the fuel from the fuel source. The swirler assembly 38 may include a plurality of swirlers (not shown) configured to swirl the compressed fluid before injecting it into an annular combustion zone 50. The fuel flowline 40 is configured to inject the fuel into the annular combustion zone 50, where the compressed fluid is mixed with the fuel and ignited to generate combustion gas. The cowl assembly 36 is configured to hold the combustor liner 32, the swirler assembly 38, and the dome assembly 34 together.

In one embodiment, the combustor liner 32 includes a panel 52, which is an annular combustion chamber defining the annular combustion zone 50. The panel 52 extends along an axial direction 54 and circumferential direction 56 to define the annular combustion zone 50 therebetween. The panel 52 extends axially from an upstream end portion 58 of the combustor liner 32 to a downstream end portion 60 of the combustor liner 32. The panel 52 is operatively coupled to the dome assembly 34 and the cowl assembly 36 at the upstream end portion 58. Further, the panel 52 is operatively coupled to the turbine at the downstream end portion 60. In the embodiment of FIG. 2, only a portion of the panel 52 is shown for ease of illustration and such an illustration should not be construed as a limitation of the present disclosure. In one example embodiment, the panel 52 is manufactured using additive manufacturing techniques. In one example embodiment, the panel 52 is a monolithic component, i.e., a component manufactured as a single piece.

In one embodiment, the combustor liner 32 includes at least one first through-hole 62 disposed on a section 52a of the panel 52 in a first row (not labeled) extending along the circumferential direction 56. The combustor liner 32 further includes a plurality of second through-holes 72 disposed on the section 52a of the panel 52. The plurality of second through-holes 72 is spaced apart from each other along the axial direction 54 and circumferential direction 56. The plurality of second through-holes 72 is arranged adjacent to the at least one first through-hole 62. Further, the plurality of second through-holes 72 includes a first set of through-holes 72a arranged in a second row (not labeled), and a second set of through-holes 72b arranged in a third row (not labeled)

different from the second row. The second and third rows may be extending along the circumferential direction 56. The at least one first through-hole 62 and the plurality of second through-holes 72 collectively cover a circumferential plane 56a of the section 52a of the panel 52 along the first, second, and third rows. In some embodiments, the at least one first through-hole 62 and each of the plurality of second through-holes 72 extend normal to the panel 52. In some other embodiments, the at least one first through-hole 62 and each of the plurality of second through-holes 72 may be inclined relative to the panel 52. The arrangement of the at least one first through-hole 62 and the plurality of second through-holes 72 are discussed in greater details below.

During operation, the compressor diffuser nozzle 42 is configured to direct a compressed fluid 66 from the compressor to the combustor. In such an example embodiment, a portion 70 of the compressed fluid 66 is directed towards the passageway 48 defined between the casing 30 and the combustor liner 32. Further, another portion 68 of the compressed fluid 66 is directed towards the swirler assembly 38. The swirler assembly 38 may be configured to impart swirling motion to the other portion 68 of the compressed fluid 66 before directing the other portion 68 into the annular combustion zone 50 (or annular combustion chamber). Further, the fuel flowline 40 is configured to direct a fuel 76 into the annular combustion zone 50, where the fuel 76 is mixed with the other portion 68 before igniting the mixture in the annular combustion zone 50 to generate combustion gas 78. The combustor liner 32 is configured to direct the combustion gas 78 from the upstream end portion 58 to the downstream end portion 60. In one embodiment, the combustion gas 78 may have some unburned portion 78a of the fuel 76 in the combustion gas 78. In such example embodiments, the at least one first through-hole 62 is configured to direct a first sub-portion 70a of the portion 70 of the compressed fluid 66 from the passageway 48 into the annular combustion zone 50 so as to aid in further combustion (oxidation) of the unburned portion 78a of the fuel 76 in the combustion gas 78. The plurality of second through-holes 72 is configured to direct a second sub-portion 70b of the portion 70 of the compressed fluid 66 from the passageway 48 into the annular combustion zone 50 so as to distribute the second sub-portion 70b of the compressed fluid 66 around the circumferential plane 56a of the section 52a of the panel 52 collectively covered by the at least one first through-hole 62 and the plurality of second through-holes 72 and purge out jet wakes. A portion of the second sub-portion 70b further enters the annular combustion zone 50 from the circumferential plane 56a to aid in combustion of the unburned portion 78a of the fuel 76 in the combustion gas 78. The combustor liner 32 is configured to direct the combustion gas 78 from the downstream end portion 60 to the turbine (not shown). In certain embodiments, the turbine may be configured to extract energy from the combustion gas 78 for powering the compressor, as well as producing useful work to propel an aircraft or to power a load such as an electrical generator.

The at least one first through-hole 62 is sized and designed such that the first sub-portion 70a of the portion 70 of the compressed fluid 66 is directed into the annular combustion zone 50 for aiding combustion (oxidation) of the unburned portion 78a of the fuel 76 in the combustion gas 78. Similarly, the plurality of second through-holes 72 is sized and designed such that the second sub-portion 70b of the portion 70 of the compressed fluid 66 is directed into the annular combustion zone 50 to diffuse around the inner surface of section 52a of the panel 52 for purging out the jet wakes, which may have formed around the at least one first through-hole 62, for example, at an aft region of the at least one first through-hole 62. In such example embodiments, the purging out of the jet wakes may result in i) preventing formation of hot spots on the section 52a of the panel and ii) moving a portion (i.e., the unburned portion 78a) of the combustion gas 78 dispersed around the at least one first through-hole 62 to the annular combustion zone 50. This results in regulating i) an inner spatial temperature of the section 52a of the panel 52 along the circumferential plane 56a, ii) emission from the combustion gas 78, and iii) formation of an NOx forming zone at the circumferential plane 56a. In some embodiments, a flow of the portion 70 of the compressed fluid 66 along the passageway 48 may further result in cooling the outer surface of the combustor liner 32, and a flow of the first sub-portion 70a and the second sub-portion 70b of the compressed fluid 66 into the annular combustion zone 50 may result in further cooling the inner surface of the combustor liner 32, thereby regulating the temperature of the combustion chamber.

Figure 3:
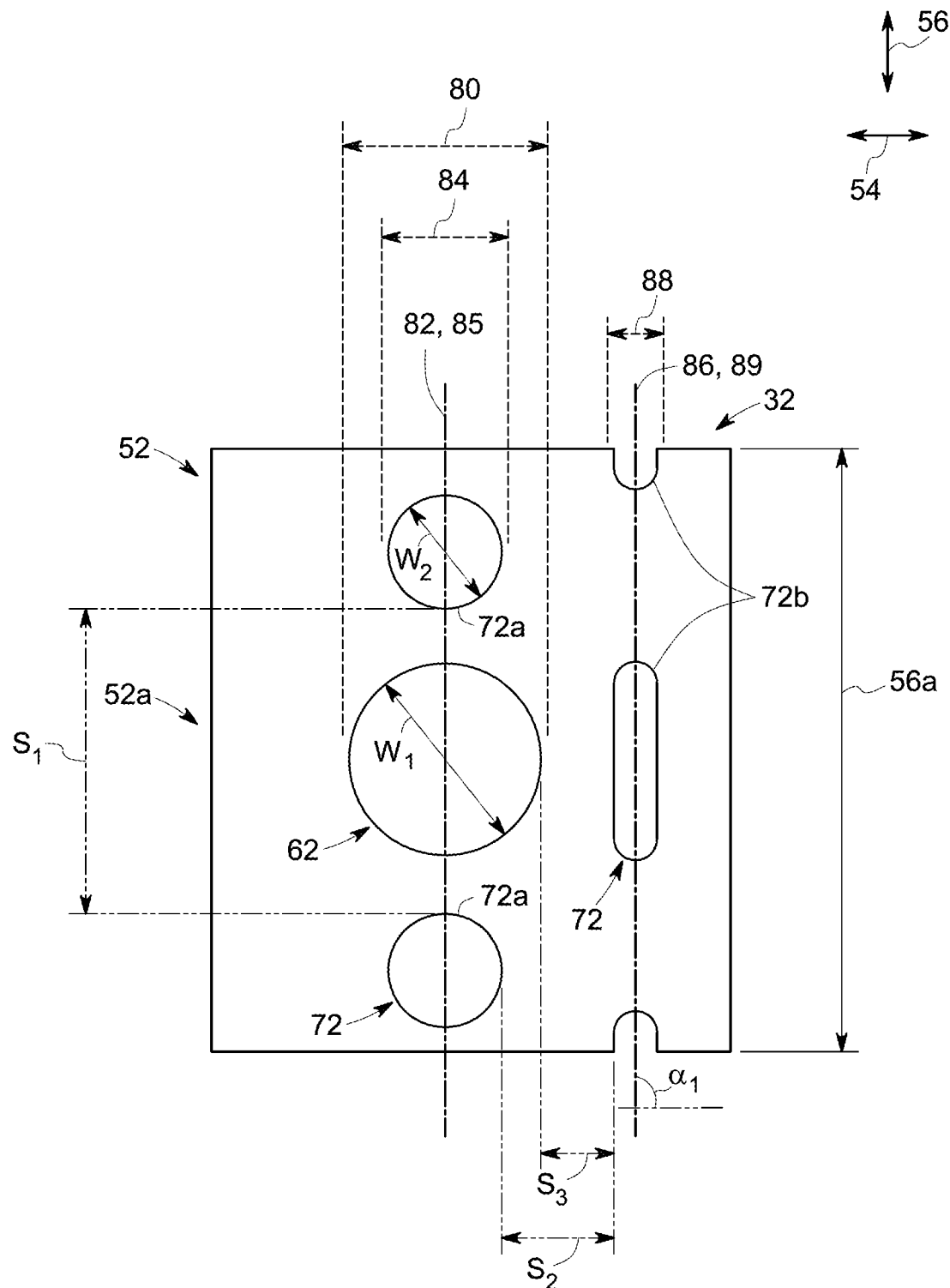
FIG. 3 is a schematic diagram of a section of a panel in accordance with one example embodiment of the present disclosure.

FIG. 3 illustrates a schematic diagram of a section 52a of a panel 52 of a combustor liner 32 in accordance with one example embodiment of the present disclosure. In one embodiment, the combustor liner 32 further includes at least one first through-hole 62 and a plurality of second through-holes 72.

In one embodiment, the at least one first through-hole 62 is disposed on the section 52a of the panel 52 in a first row 80 extending along the circumferential direction 56. In other words, the at least one first through-hole 62 is located on at least the section 52a of the panel 52. In one embodiment, the first row 80 encompasses the at least one first through-hole 62 such that the at least one first through-hole 62 and the first row 80 have a substantially same centerline 82. It should be noted herein that the term "centerline" as used in the context refer to a line extending along the middle of the first row 80 and/or the first through-hole 62. In the illustrated embodiment, the at least one first through-hole 62 is a circular through-hole. In some other embodiments, the at least one first through-hole 62 may be a non-circular through-hole, for example, a square shaped through-hole, a rectangular shaped through-hole, an oval shaped through-hole, an elliptical shaped through-hole, race-track through-hole, or the like. The at least one first through-hole 62 has a first width "$W_1$".

In one embodiment, the plurality of second through-holes 72 is disposed on the section 52a of the panel 52. In other words, the plurality of second through-holes 72 is located on at least the section 52a of the panel 52. The plurality of second through-holes 72 is spaced apart from each other along an axial direction 54 and the circumferential direction 56, and arranged adjacent to the at least one first through-hole 62. In some embodiments, the plurality of second through-holes 72 includes a first set of through-holes 72a and a second set of through-holes 72b. The first set of through-holes 72a is arranged in a second row 84 and the second set of through-holes 72b is arranged in a third row 88 different from the second row 84. In the illustrated embodiment, the second and third rows 84, 88 extend along the circumferential direction 56. In the illustrated embodiment, the second row 84 overlaps with the first row 80 such that the centerlines 82, 85 of the first and second rows 80, 84 are substantially same. In one embodiment, the second row 84 encompasses the first set of through-holes 72a such that the first set of through-holes 72a and the second row 84 have the substantially same centerline 85. Similarly, the third row 88 encompasses the second set of through-holes 72b such than a centerline 86 (i.e., a major axis) of the second set of through-holes 72b passes along a centerline 89 of the third row 88. In one embodiment, at least one through-hole of the plurality of second through-holes 72 is a circular hole. For example, in the illustrated embodiment, each through-hole of the first set of through-holes 72a is a circular through-hole and each through-hole of the second set of through-holes 72b is a non-circular through-hole. In some other embodiments, at least one through-hole of the first set of through-holes 72a may be a non-circular through-hole. Similarly, at least one through-hole of the second set of through-holes 72b may be a circular hole. In one embodiment, each through-hole of the first set of through-holes 72a has a second width "$W_2$". In some other embodiments, each through-hole of the first set of through-holes 72a may have different width. In the illustrated embodiment, the second width "$W_2$" is different from the first width "$W_1$". For example, the first width "$W_1$" is greater than the second width "$W_2$". In the illustrated embodiment, each through-hole of the second set of through-holes 72b is an elliptical through-hole. In some other embodiments, the other non-circular through-hole may include a square-shaped through-hole, a rectangular shaped through-hole, an oval shaped through-hole, a race-track through-hole, or the like. In one embodiment, the major axis 86 is inclined at an angle "$\alpha_1$" relative to a longitudinal axis (i.e., along an axial direction 54 of the gas turbine engine or an axial flow direction of combustion gas). In the illustrated embodiment, the angle "$\alpha_1$" is 90 degrees.

In one embodiment, a circumferential distance "$S_1$" between mutually adjacent through-holes of the plurality of second through-holes 72 is greater than 0.08 inches. For example, the circumferential distance "$S_1$" between the mutually adjacent through-holes of the first set of through-holes 72a is greater than 0.08 inches. In the illustrated embodiment, the circumferential distance "$S_1$" is measured between a closest edge of the mutually adjacent through-holes of the first set of through-holes 72a. Similarly, an axial distance "$S_2$" between the mutually adjacent through-holes of the plurality of second through-holes 72 is greater than 0.08 inches. For example, the axial distance "$S_2$" between the mutually adjacent through-holes of the first and second set of through-holes 72a, 72b is greater than 0.08 inches. In the illustrated embodiment, the axial distance "$S_2$" is measured between a closest edge of the mutually adjacent through-holes of the first and second set of through-holes 72a, 72b. Further, an axial distance "$S_3$" between the at least one first through-hole 62 and a mutually adjacent second through-hole 72a of the plurality of second through-holes 72 is greater than 0.08 inches. In the illustrated embodiment, the axial distance "$S_3$" is measured between a closest edge of the one first through-hole 62 and a closest edge of the mutually adjacent second set of through-hole 72b. It should be noted herein that width of the rows 80, 84, 88 are greater than the width of the respective through-holes 62, 72a, 72b. For example, the width of the first row 80 is greater than the first width "$W_1$" of the at least one first through-hole 62 and the width of the second row 84 is greater than the second width "$W_2$" of the first set of through-holes 72a.

In one or more embodiments, the at least one first through-hole 62 and the plurality of second through-holes 72 collectively cover a circumferential plane 56a of the section 52a of the panel 52 along the first, second, and third rows 80, 84, 88 such that the combustion gas has no see through of the portion of the panel 52 corresponding to the circumferential plane 56a. In other words, the first and second sub-portions of the compressed fluid directed from the at least one first through-hole 62 and the plurality of second through-holes 72 prevents the combustion gas to contact an inner surface of the portion of the panel corresponding to the circumferential plane 56a, thereby resulting in purging out jet wakes and stopping formation of hot spots along the circumferential plane 56a. Flow pattern of the compressed fluid and the combustion gas along the section 52a of the panel 52 are discussed in greater details below.

Figure 4:
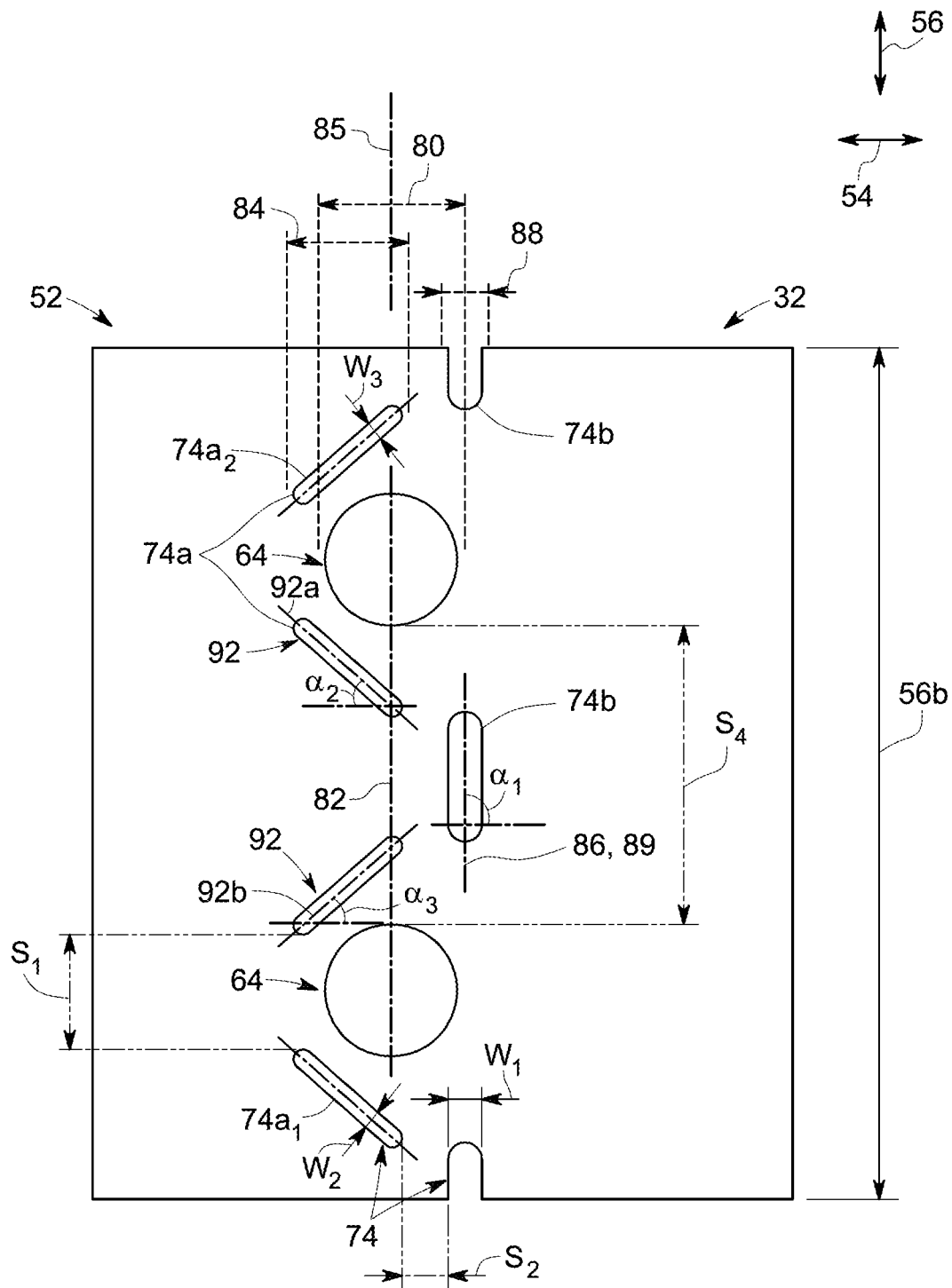
FIG. 4 is a schematic diagram of a section of a panel in accordance with another example embodiment of the present disclosure.

FIG. 4 illustrates a schematic diagram of a section 52b of a panel 52 of a combustor liner 32 in accordance with another example embodiment of the present disclosure. Further, referring to the FIG. 2, the combustor liner 32 may include another section 52b of the panel 52. The section 52b of the panel 52 includes a plurality of first through-hole 64 and a plurality of second through-holes 74. In the illustrated embodiment of FIGS. 2 and 4, the plurality of first through-hole 64 is disposed on the section 52b of the panel 52 in a first row 80 extending along the circumferential direction 56. The plurality of second through-holes 74 is disposed on the section 52b of the panel 52. The plurality of second through-holes 74 is spaced apart from each other along the axial direction 54 and the circumferential direction 56, and arranged adjacent to the plurality of first through-hole 64. The plurality of second through-holes 74 includes a first set of through-holes 74a arranged in a second row 84 and a second set of through-holes 74b arranged in a third row 88 different from the second row 84. The second and third rows 84, 88 extend along the circumferential direction 56. The plurality of first through-holes 64 and the plurality of second through-holes 74 collectively cover a circumferential plane 56b of the section 52b of the panel 52 along the first, second, and third rows 80, 84, 88.

In one embodiment, the first row 80 encompasses the plurality of first through-holes 64 such that the plurality of first through-holes 64 the first row 80 have a same centerline 82. In the illustrated embodiment, each of the plurality of first through-holes 64 is a circular through-hole. In some other embodiments, at least one of the plurality of first through-holes 64 may be a non-circular through-hole, for example, a square-shaped through-hole, a rectangular shaped through-hole, an oval shaped through-hole, a race-track through-hole, or the like.

In the illustrated embodiment, at least one of the second row 84 or the third row 88 partially overlaps with the first row 80. In one embodiment, the second row 84 encompasses the first set of through-holes 74a such that a centerline 92 (i.e., a major axis) of each through-hole of the first set of through-holes 74a does not passes along a centerline 85 of the second row 84. Similarly, the third row 88 encompasses the second set of through-holes 74b such than a centerline 86 (i.e., a major axis) of the second set of through-holes 74b passes along a centerline 89 of the third row 88. In one embodiment, at least one through-hole of the plurality of second through-holes 74 is a non-circular hole. For example, in the illustrated embodiment, each through-hole of the first set of through-holes 74a and the second set of through-holes 74b is a non-circular through-hole. In some other embodiments, at least one through-hole of the first set of through-holes 74a and the second set of through-holes 74b may be a circular through-hole. In the illustrated embodiment, each through-hole of the first and second set of through-holes 74a, 74b is an elliptical through-hole. In one embodiment, each through-hole of the second set of through-holes 74b has the major axis 86 inclined at an angle "$\alpha_1$" relative to a longitudinal axis (i.e., along an axial direction 54 of the gas turbine engine or an axial flow direction of combustion gas). In the illustrated embodiment, the angle "$\alpha_1$" is 90 degrees. Further, each through-hole of the second set of through-holes 74b has a first width "$W_1$" extending along a minor axis of the corresponding through-hole. In one embodiment, each through-hole of the first set of through-holes 74a has the major axis 92. For example, two through-holes 74$a_1$ of the first set of through-holes 74a has a major axis 92a, which is inclined at a second angle "$\alpha_2$" relative to the longitudinal axis and two through-holes 74$a_2$ of the first set of through-holes 74a has a major axis 92b, which is inclined at a third angle "$\alpha_3$" relative to the longitudinal axis. The third angle "$\alpha_3$" is different from the second angle "$\alpha_2$". In one embodiment, the second angle "$\alpha_2$" and the third angle "$\alpha_3$" may be in a range from 20 degrees to 160 degrees. For example, the second angle "$\alpha_2$" is 150 degrees and the third angle "$\alpha_3$" is 30 degrees. In some other embodiments, the other non-circular through-hole may include a square-shaped through-hole, a rectangular shaped through-hole, an oval shaped through-hole, or a race-track through-hole, or the like. Further, each through-hole of the first set of through-holes 74a has a second width "$W_2$" extending along a minor axis of the corresponding through-hole. Similarly, each through-hole of the second set of through-holes 74b has a third width "$W_3$" extending along a minor axis of the corresponding through-hole. In some embodiments, the second width "$W_2$" is different from the third width "$W_3$". In the illustrated embodiment, the second width "$W_2$" is substantially same as the third width "$W_3$". Further, the first width "$W_1$" may be different from the second width "$W_2$" and/or the third width "$W_3$". In the illustrated embodiment, the first width "$W_1$" is greater than the second width "$W_2$" and/or the third width "$W_3$".

In one embodiment, a circumferential distance "$S_1$" (i.e., distance measured along circumferential direction 56) between mutually adjacent through-holes of the plurality of second through-holes 74 is greater than 0.08 inches. For example, the circumferential distance "$S_1$" between the mutually adjacent through-holes of the first set of through-holes 74a is greater than 0.08 inches. In the illustrated embodiment, the circumferential distance "$S_1$" is measured between a closest edge of the mutually adjacent through-holes of the first set of through-holes 74a. Similarly, an axial distance "$S_2$" (i.e., distance measured along axial direction 54) between the mutually adjacent through-holes of the plurality of second through-holes 74 is greater than 0.08 inches. In the illustrated embodiment, the axial distance "$S_2$" is measured between a closest edge of the mutually adjacent through-holes of the plurality of second through-holes 74. For example, the axial distance "$S_2$" between the mutually adjacent through-holes of the first and second set of through-holes 74a, 74b is greater than 0.08 inches. Further, a circumferential distance "$S_4$" between mutually adjacent through-holes of the plurality of first through-holes 64 is greater than 1.5 hydraulic diameter of a through-hole of the plurality of first through-holes 64. In the illustrated embodiment, the circumferential distance "$S_4$" is measured between a closest edge of the plurality of first through-holes 64.

Although not illustrated, in certain embodiments, the panel 52 includes the plurality of first through-holes 64 spaced apart from each other along the circumferential direction 56 and arranged in the first row 80. In such an embodiment, the plurality of second through-holes 74 is disposed proximate to the plurality of first through-holes 64 such that the plurality of first and second through-holes 64, 74 may collectively cover the circumferential plane of the entire panel 52 along the first, second, and third rows 80, 84, 88.

Figure 5:
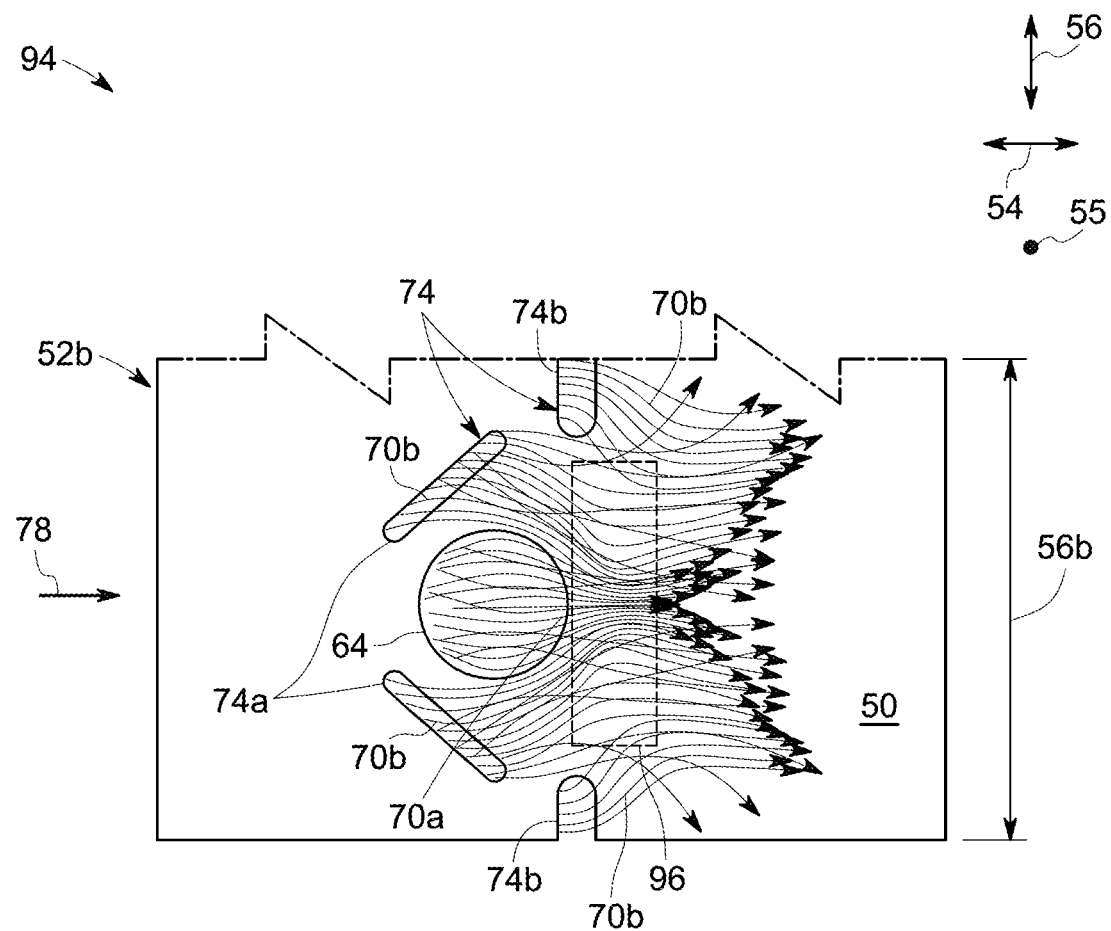
FIG. 5 is a schematic diagram of a computational fluid dynamics simulation depicting a fluid flow pattern along the section of the panel in accordance with the example embodiment of FIG. 4.

FIG. 5 illustrates a schematic diagram of a computational fluid dynamics simulation depicting a fluid flow pattern 94 along the section 52b of the panel 52 in accordance with the example embodiment of FIG. 4. In the embodiment of FIG. 5 only a portion of the section 52b is shown for ease of illustration and such an illustration should not be construed as a limitation of the present disclosure. In the illustrated embodiment, the portion of the section 52b includes one first through-hole 64 and the plurality of second through-holes 74. In such an example embodiment, the plurality of second through-holes 74 includes two first set of through-holes 74a and two second set of through-holes 74b.

As discussed, in the embodiment of FIG. 2, the combustion gas 78 flows from the upstream end portion of the combustor liner 32 to the downstream end of the combustor liner 32. The first through-hole 64 directs the first sub-portion 70a of the compressed fluid in a radial direction 55 of the gas turbine engine, from the passageway into the annular combustion zone 50. The first sub-portion 70a of the compressed fluid is used to further aid in combustion of an unburned portion of the fluid and fuel mixture in the combustion gas. In the illustrated embodiment, directing the first sub-portion 70a of the compressed fluid may result in formation of jet wakes at an aft region 96 of the first through-hole 64. In such an example embodiment, the plurality of second through-holes 74 directs the second sub-portion 70b of the compressed fluid to distribute the second sub-portion 70b of the compressed fluid around the circumferential plane 56b of the section 52b of the panel 52 collectively covered by the first through-hole 64 and the plurality of second through-holes 74 and purge out the jet wakes. In one example embodiment, the first set of through-holes 74a may disperse the second sub-portion 70b of the compressed fluid to purge out the jet wakes formed at the aft region 95 of the first through-hole 64, and the second set of through-holes 74b may disperse the second sub-portion 70b of the compressed fluid to cover the circumferential plane 56b of the section 52b of the panel 52 so as to prevent the combustion gas 78 to have a see through of an inner surface of the section 52b of the panel 52 along the circumferential plane 56b. In accordance to one or more embodiments, the second sub-portion 70b of the compressed fluid may thus prevent formation of hot spots in the aft region 96 and thus regulate an inner spatial temperature of the section 52b of the panel 52 along the circumferential plane. Further, the second sub-portion 70b of the compressed fluid may move a portion of the combustion gas 78 dispersed around the first through-hole 64 to the annular combustion zone 50, thereby resulting in regulating emission from the combustion gas and NOx producing zones.

Figure 6:
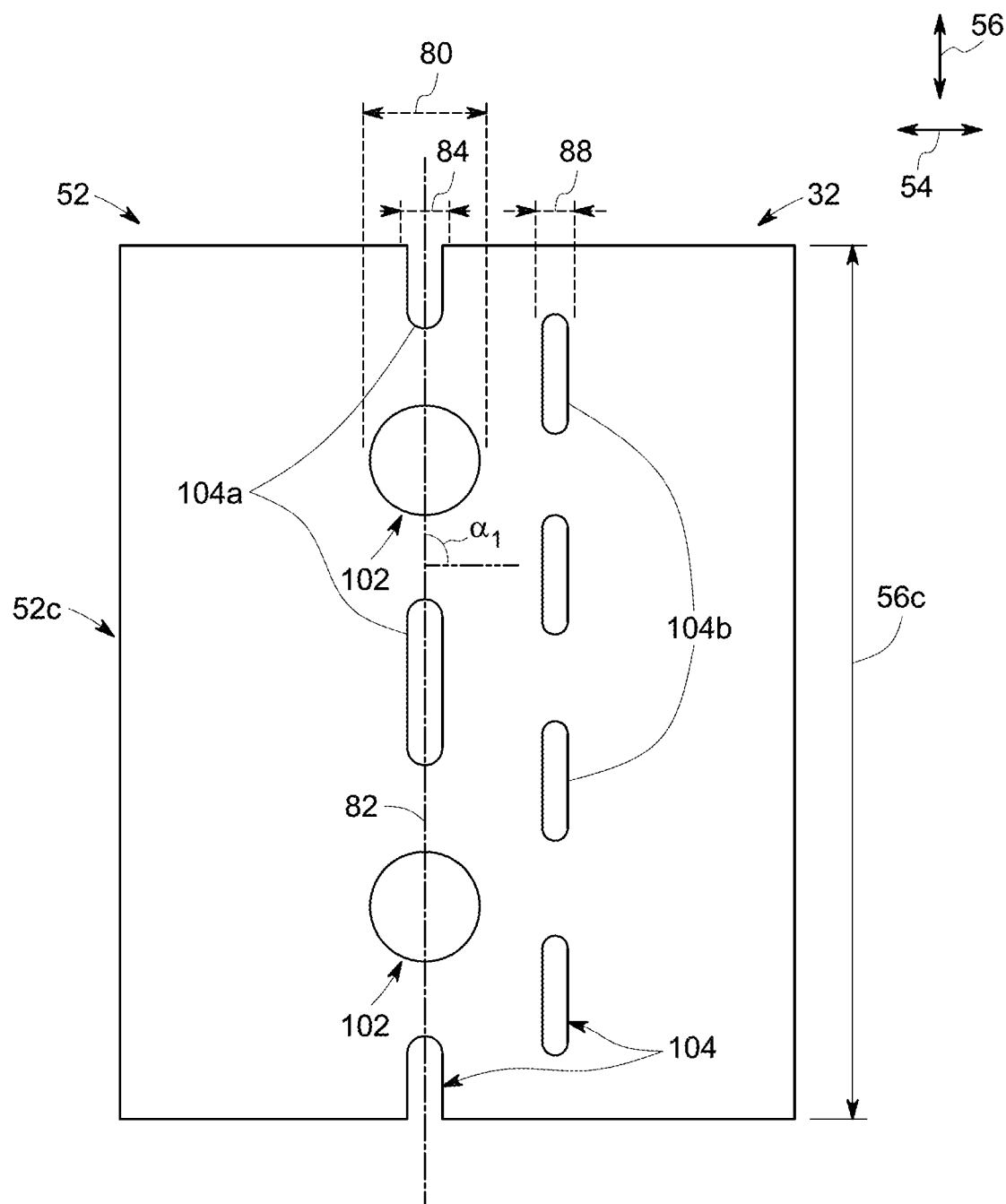
FIG. 6 is a schematic diagram of a section of a panel in accordance with yet another example embodiment of the present disclosure.

FIG. 6 illustrates a schematic diagram of a section 52c of a panel 52 of a combustor liner 32 in accordance with yet another example embodiment of the present disclosure. In one embodiment, the combustor liner 32 includes a plurality of first through-holes 102 and a plurality of second through-holes 104. The plurality of first through-holes 102 is disposed on the section 52c of the panel 52 in a first row 80 extending along a circumferential direction 56. The plurality of second through-holes 104 is disposed on the section 52c of the panel 52. Further, the plurality of second through-holes 104 is spaced apart from each other along the axial direction 54 and the circumferential direction 56, and arranged adjacent to the plurality of first through-holes 102. The plurality of second through-holes 104 includes a first set of through-holes 104a and a second set of through-holes 104b. In some other embodiments, the plurality of second through-holes 104 may include a third set of through-holes and a fourth set of through-holes depending on the application and design criteria. The first set of through-holes 104a is arranged in a second row 84 and the second set of through-holes 104b is arranged in a third row 88 different from the second row 84. The second and third rows 84, 88 extend along the circumferential direction 56. In the illustrated embodiment, the second row 84 overlaps with the first row 80 and the third row 88 partially overlaps with the first row 80. The plurality of first through-holes 102 and the plurality of second through-holes 104 collectively cover a circumferential plane 56c of the section 52c of the panel 52 along the first, second, and third rows 80, 84, 88.

In the embodiment of FIG. 6 each through-hole of the first set of through-holes 104a and each through-hole of the first set of through-holes 74a have a same centerline axis 82. In the illustrated embodiment, the centerline 82 is inclined at an angle "$\alpha_1$" relative to a longitudinal axis (i.e., along an axial direction 54 of the gas turbine engine or an axial flow direction of combustion gas). In the illustrated embodiment, the angle "$\alpha_1$" is 90 degrees. Further, each through-hole of the first set of through-holes 104a has a first width "$W_1$" extending along a minor axis of the corresponding through-hole. Similarly, each through-hole of the second set of through-holes 104b has a second width "$W_2$" extending along a minor axis of the corresponding through-hole. In one embodiment, the first width "$W_1$" is different from the second width "$W_2$". In the illustrated embodiment, the first width "$W_1$" is greater than the second width "$W_2$". As discussed, in the embodiment of FIGS. 1-6, the plurality of second through-holes 104 is configured to discharge a second sub-portion of the compressed fluid from a passageway into an annular combustion zone to distribute the second sub-portion of the compressed fluid around the circumferential plane 56c of the section 52c of the panel 52 collectively covered by the plurality of first and second through-holes 102, 104 and purge out the jet wakes.

Figure 7:
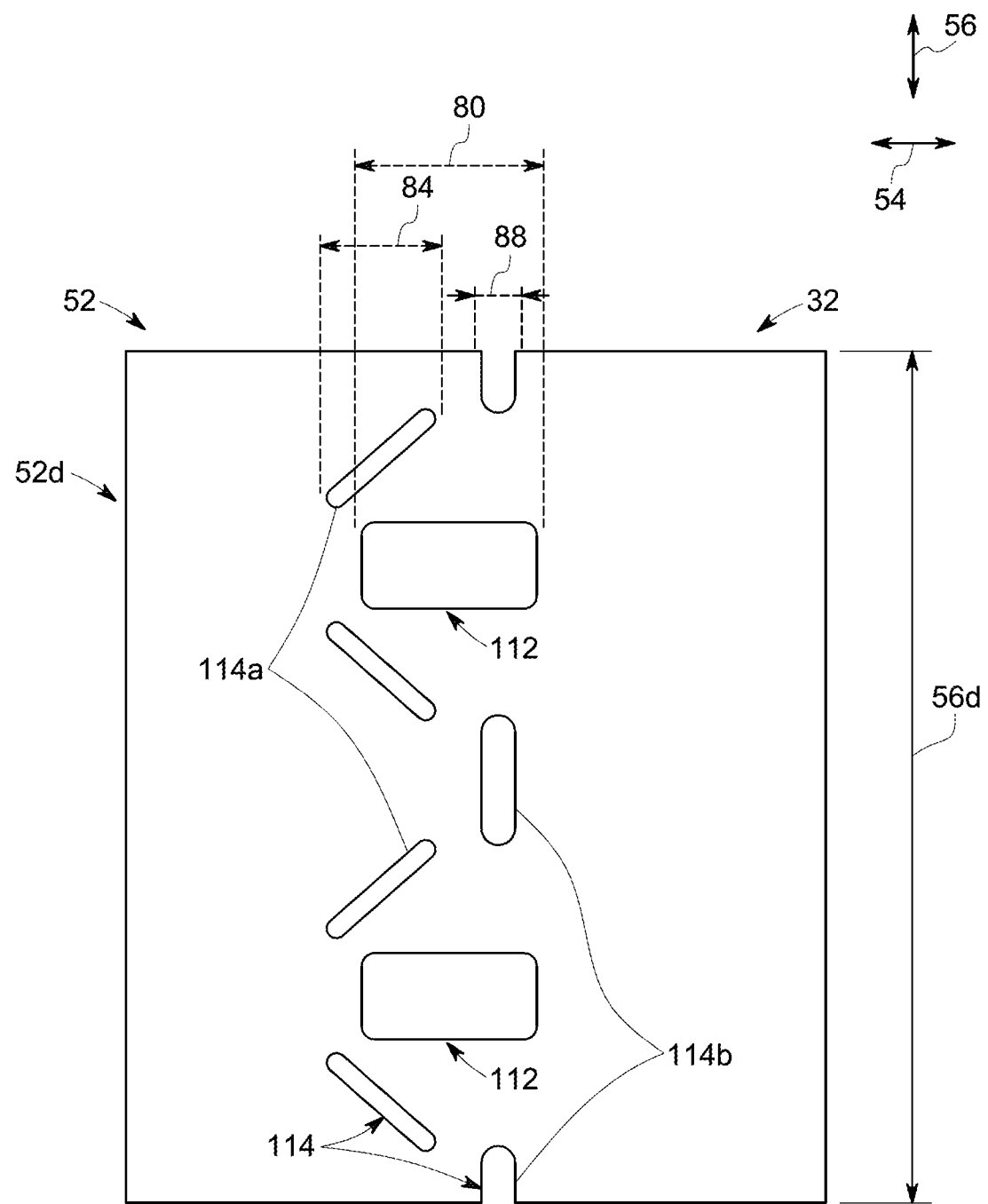
FIG. 7 is a schematic diagram of a section of a panel in accordance with yet another example embodiment of the present disclosure.

FIG. 7 illustrates a schematic diagram of a section 52d of a panel 52 of a combustor liner 32 in accordance with yet another example embodiment of the present disclosure. In one embodiment, the combustor liner 32 further includes a plurality of first through-holes 112 and a plurality of second through-holes 114. The plurality of first through-holes 112 is disposed on the section 52d of the panel 52 in a first row 80 extending along a circumferential direction 56. The plurality of second through-holes 114 is disposed on the section 52d of the panel 52. Further, the plurality of second through-holes 114 is spaced apart from each other along the axial direction 54 and the circumferential direction 56, and arranged adjacent to the plurality of first through-holes 112. The plurality of second through-holes 114 includes a first set of through-holes 114a and a second set of through-holes 114b. The first set of through-holes 114a is arranged in a second row 84 and the second set of through-holes 114b is arranged in a third row 88 different from the second row 84. The second and third rows 84, 88 extend along the circumferential direction 56. In the illustrated embodiment, the second row 84 partially overlaps with the first row 80 and the third row 88 overlaps with the first row 80. The plurality of first through-holes 112 and the plurality of second through-holes 114 collectively cover a circumferential plane 56d of the section 52d of the panel 52 along the first, second, and third rows 80, 84, 88. The embodiment of FIG. 7 is substantially similar to the embodiment of FIG. 4, wherein at least one through-hole of the plurality of first through-holes 112 is a non-circular hole. For example, in the illustrated embodiment of FIG. 7, each through-hole of the plurality of first through-holes 112 is a rectangular hole. As discussed, in the embodiment of FIGS. 1-6, the plurality of second through-holes 114 is configured to discharge a second sub-portion of the compressed fluid from a passageway into an annular combustion zone to distribute the second sub-portion of the compressed fluid around the circumferential plane 56d of the section 52c of the panel 52 collectively covered by the plurality of first and second through-holes 112, 114 and purge out the jet wakes.

Figure 8:
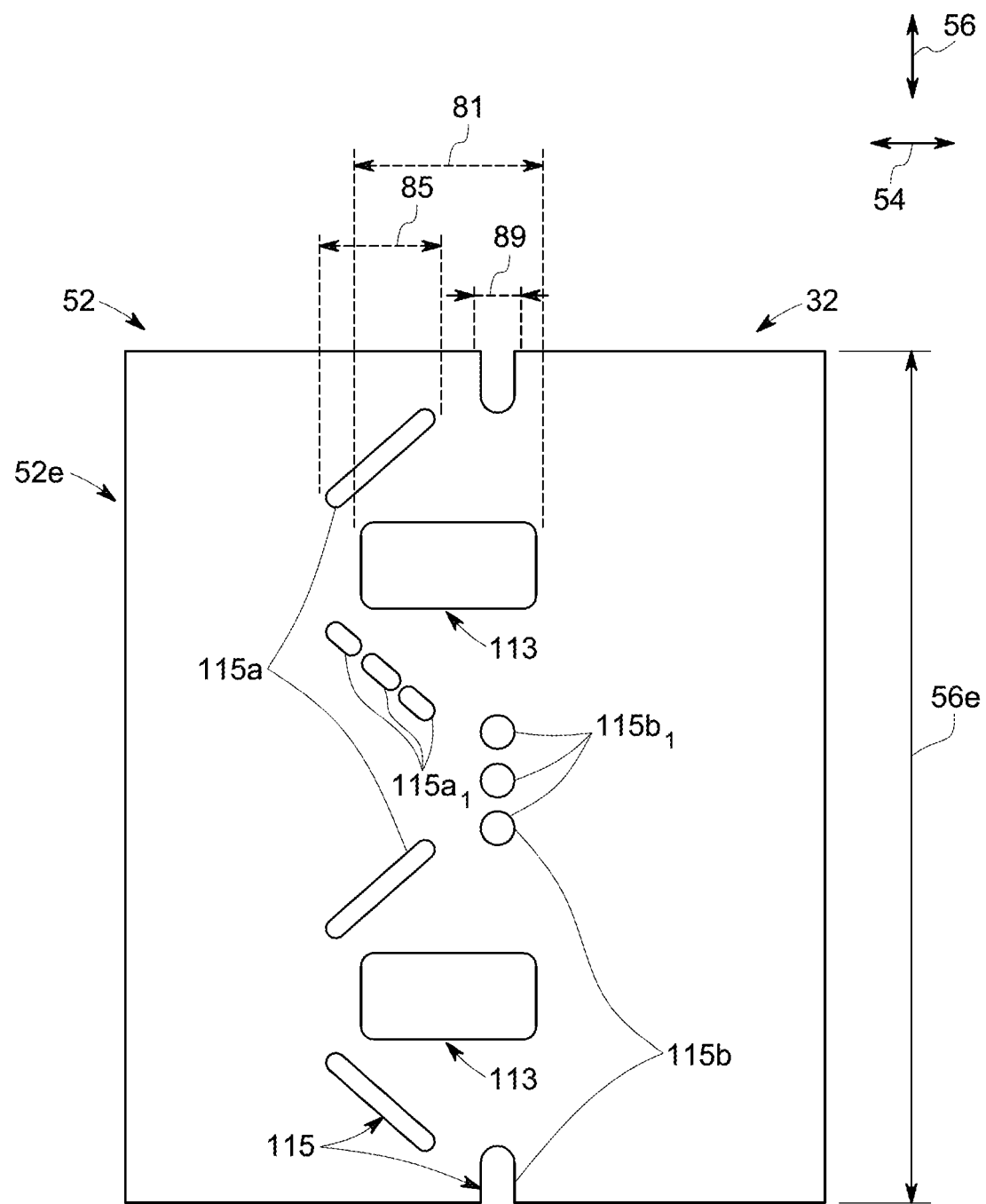
FIG. 8 is a schematic diagram of a section of a panel in accordance with yet another example embodiment of the present disclosure.

FIG. 8 illustrates a schematic diagram of a section 52e of a panel 52 of a combustor liner 32 in accordance with yet another example embodiment of the present disclosure. In one embodiment, the combustor liner 32 further includes a plurality of first through-holes 113 and a plurality of second through-holes 115. The plurality of first through-holes 113 is disposed on the section 52e of the panel 52 in a first row 81 extending along a circumferential direction 56. The plurality of second through-holes 115 is disposed on the section 52e of the panel 52. Further, the plurality of second through-holes 115 is spaced apart from each other along the axial direction 54 and the circumferential direction 56, and arranged adjacent to the plurality of first through-holes 113. The plurality of second through-holes 115 includes a first set of through-holes 115a and a second set of through-holes 115b. The first set of through-holes 115a is arranged in a second row 85 and the second set of through-holes 115b is arranged in a third row 89 different from the second row 85. The second and third rows 85, 89 extend along the circumferential direction 56. In the illustrated embodiment of FIG. 8, at least one through-hole of the first set of through-holes 115a is a collection of discrete first holes $115a_1$. Similarly, at least one through-hole of the second set of through-holes 115b is a collection of discrete second holes $115b_1$. As discussed, in the embodiment of FIGS. 1-7, the plurality of second through-holes 115 is configured to discharge a second sub-portion of the compressed fluid from a passageway into an annular combustion zone to distribute the second sub-portion of the compressed fluid around the circumferential plane 56e of the section 52e of the panel 52 collectively covered by the plurality of first and second through-holes 113, 115 and purge out the jet wakes.

Figure 9:
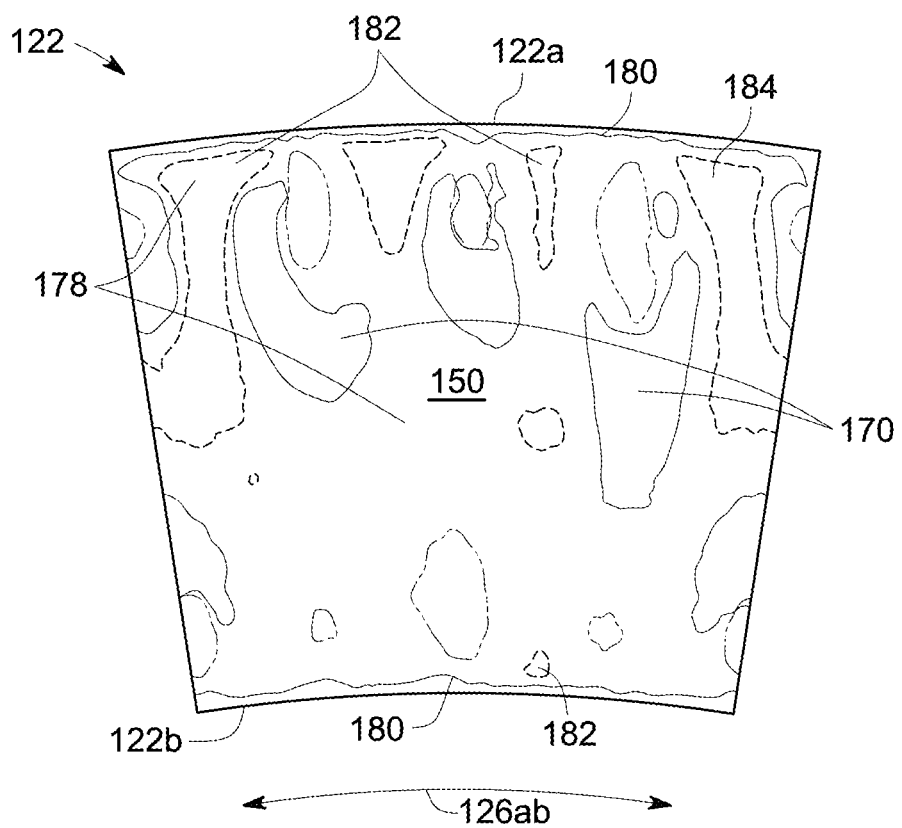
FIG. 9 is a schematic diagram depicting a temperature profile along a conventional panel.

FIG. 9 illustrates a schematic diagram depicting a temperature profile 120 within a conventional panel 122 i.e., in a combustion zone 150 defined between an upper and lower panel sections 122a, 122b of the conventional panel 122. In the illustrated embodiment, a flow of the combustion gas 178 is scattered along the inner surfaces of sections 122a, 122b of the panel 122. Similarly, a flow of the compressed fluid 170 from a plurality of openings (not shown) may result in leaving behind jet wakes 180 at aft regions of the plurality of openings, thereby resulting in forming hot spots along the sections 122a, 122b and spatial temperature 184 along a circumferential plane 126ab of the panel 122. Further, the jet wakes 180 may further result in formation of NOx production zones, thereby increasing the emission of the combustion gas 178.

Figure 10:
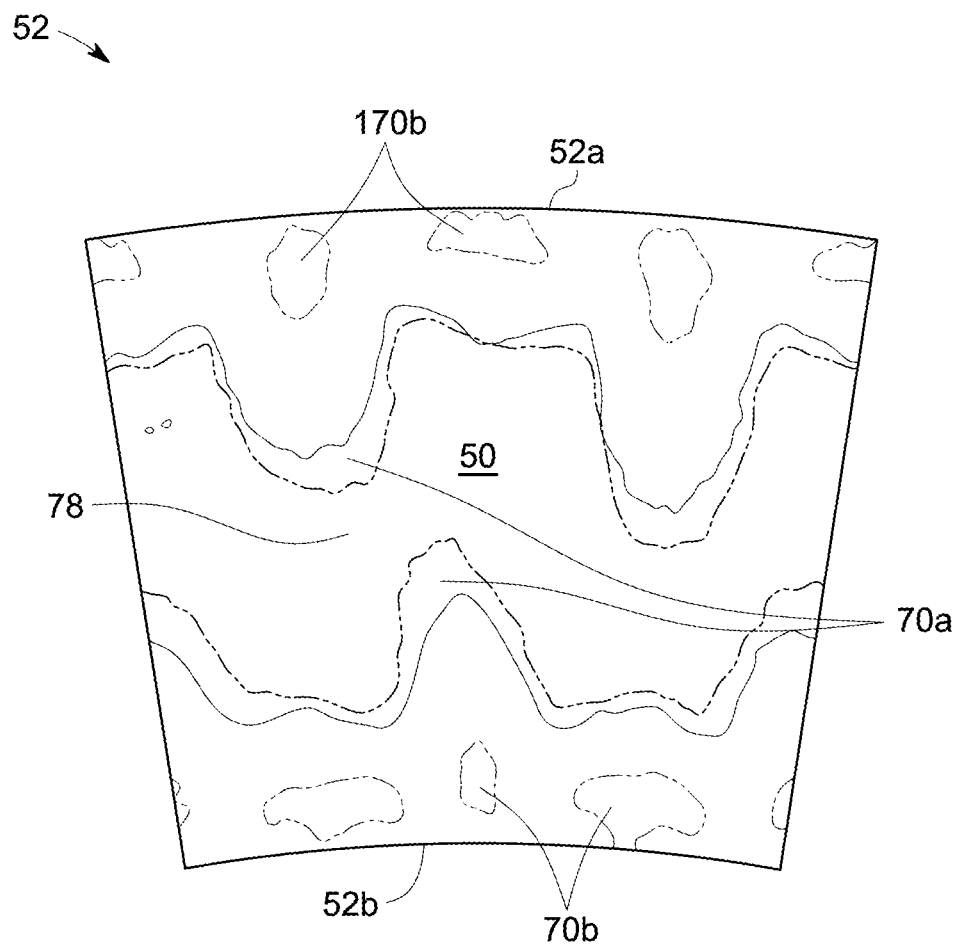
FIG. 10 is a schematic diagram depicting a temperature profile along a panel in accordance with one example embodiment of the present disclosure.

FIG. 10 illustrates a schematic diagram depicting a temperature profile 200 within a panel 52 in accordance with one example embodiment of the present disclosure. In the illustrated embodiment, a flow of the combustion gas 78 is concentrated along a mid-region of an annular combustion zone 50, which is substantially away from inner surfaces of panel sections 52a, 52b of the panel 52. Similarly, flow of the first sub-portion 70a of a compressed fluid via either at least one first through-hole or a plurality of first through-holes (not shown) may result in aiding the combustion of unburned portion of fuel and fluid mixture at the mid-region of the annular combustion zone 50. Similarly, flow of second sub-portion 70b of the compressed fluid via a plurality of second through-holes purges out jet wakes at aft regions of at least one first through-hole or each through hole of the plurality of first through-holes, thereby resulting in preventing formation of hot spots along the panel sections 52a, 52b and regulating spatial temperature along a circumferential plane 56ab of the panel 52. Further, the second sub-portion 70b of the compressed fluid may further result in move the combustion gas to the mid-region of the annular combustion zone 50, thereby prevention NOx production zones and decreasing emission of the combustion gas 78.

Figure 11:
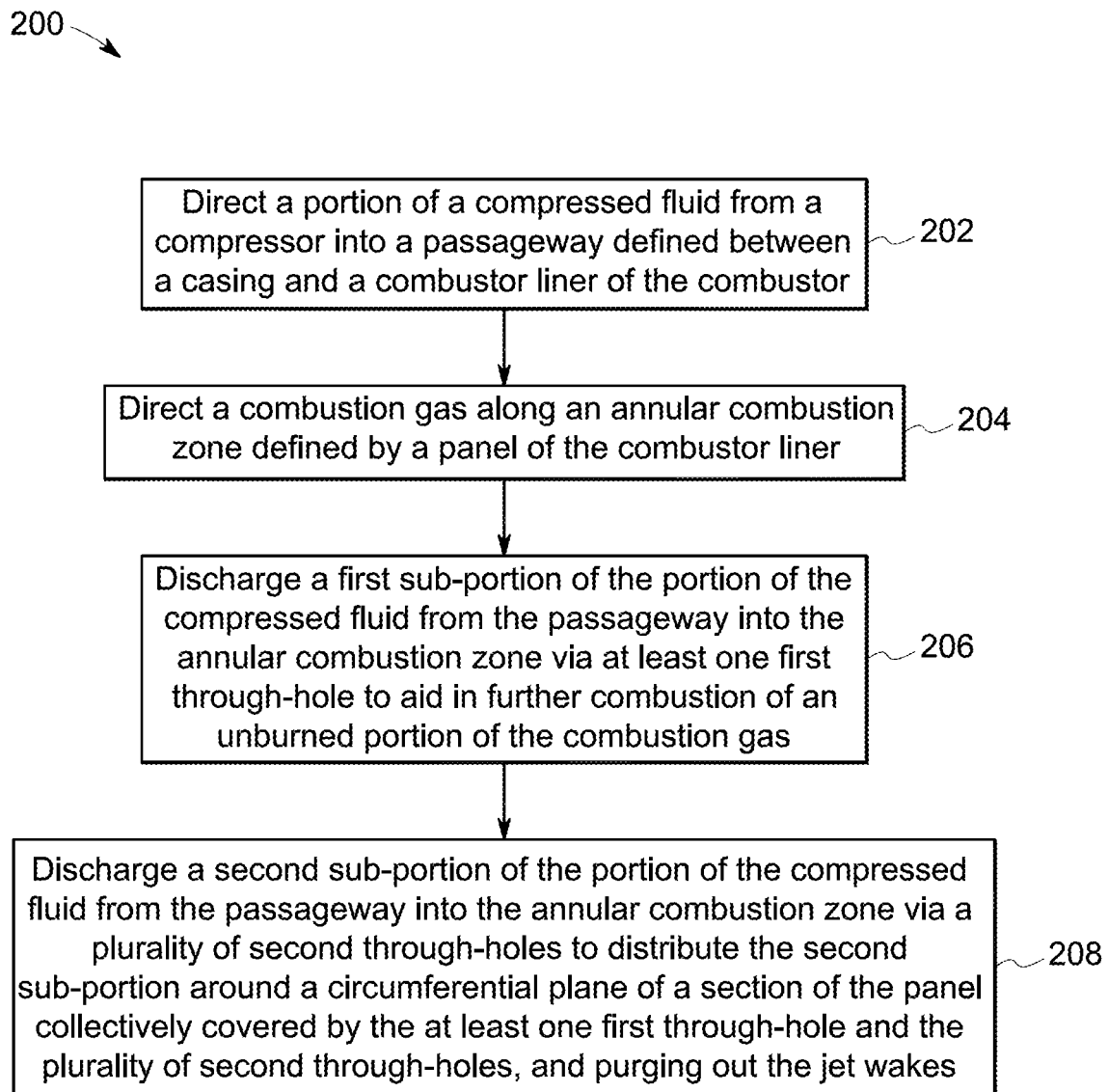
FIG. 11 is a flow chart illustrating a method for regulating jet wakes in a combustor in accordance with one example embodiment of the present disclosure.

FIG. 11 is a flow chart illustrating a method 200 for regulating jet wakes in a combustor in accordance with one example embodiment of the present disclosure. In one embodiment, the method 200 includes a step 202 of directing a portion of a compressed fluid from a compressor into a passageway defined between a casing and a combustor liner of the combustor. In some embodiments, the portion of the compressed fluid may be used for cooling the combustor liner. Further, the method 200 includes a step 204 of directing a combustion gas along an annular combustion zone defined by a panel of the combustor liner. In such embodiments, the combustion may be configured to receive another portion of the compressed fluid from the compressor and a fuel from a fuel source. The combustor may be further configured to ignite a mixture of the fuel and the other portion of the compressed fluid to generate the combustion gas. The method 200 further includes a step 206 of discharging a first sub-portion of the portion of the compressed fluid from the passageway into the annular combustion zone via at least one first through-hole to aid in further combustion (i.e., ignition) of an unburned portion of the combustion gas. In one or more embodiments, the at least one first through-hole is disposed on at least a section of the panel in a first row extending along a circumferential direction. The method 200 further includes a step 208 of discharging a second sub-portion of the portion of the compressed fluid from the passageway into the annular combustion zone via a plurality of second through-holes to distribute the second sub-portion around a circumferential plane of the section of the panel collectively covered by the at least one first through-hole and the plurality of second through-holes, and purging out the jet wakes. Thus, the plurality of second through-holes is used to regulate jet wakes and production of hot spots therefrom on the section of the panel, thereby preventing overheating of the combustion chamber, and increasing service life of the combustor chamber. In certain embodiments, the plurality of second through-holes may be used for discharging the second sub-portion of the compressed fluid to further regulate emission (e.g., NOx producing zones) from the combustion gas by moving a portion of the combustion gas dispersed around the at least one first through-hole to the annular combustion zone, for example, towards a center line axis of the combustion chamber. In one or more embodiments, the plurality of second through-holes is disposed on the section of the panel, spaced apart from each other along an axial direction and the circumferential direction, and arranged adjacent to the at least one first through-hole. The plurality of second through-holes comprises a first set of through-holes and a second set of through-holes. The first set of through-holes is arranged in a second row and the second set of through-holes is arranged in a third row different from the second row. The second and third rows extend along the circumferential direction.

While only certain features of embodiments have been illustrated and described herein, many modifications and changes will occur to those skilled in the art. It is, therefore, to be understood that the appended embodiments are intended to cover all such modifications and changes as falling within the spirit of the invention.

The invention claimed is:

1. A method for regulating jet wakes in a combustor, comprising:
    directing a portion of a compressed fluid from a compressor into a passageway defined between a casing and a combustor liner of the combustor;
    directing a combustion gas along an annular combustion zone defined by a panel of the combustor liner;
    discharging a first sub-portion of the portion of the compressed fluid from the passageway into the annular combustion zone via at least one first through-hole to aid in further combustion of an unburned portion of the combustion gas,
    wherein the at least one first through-hole is disposed on at least a section of the panel in a first row extending along a circumferential direction; and
    discharging a second sub-portion of the portion of the compressed fluid from the passageway into the annular combustion zone via a plurality of second through-holes to distribute the second sub-portion around a circumferential plane of the section of the panel collectively covered by the at least one first through-hole and the plurality of second through-holes, and purging out the jet wakes,
    wherein the plurality of second through-holes is disposed on the section of the panel, spaced apart from each other along an axial direction and the circumferential direction, and arranged adjacent to the at least one first through-hole, wherein the plurality of second through-holes comprises a first set of through-holes and a second set of through-holes, wherein the first set of through-holes is arranged in a second row and the second set of through-holes is arranged in a third row different from the second row, wherein the second and third rows extend along the circumferential direction, and wherein the second row overlaps with the first row.

2. The method of claim 1, wherein discharging the second sub-portion of the portion of the compressed fluid further comprises regulating emission from the combustion gas by moving a portion of the combustion gas dispersed around the at least one first through-hole to the annular combustion zone.

3. The method of claim 1, wherein discharging the first sub-portion and the second sub-portion of the portion of the compressed fluid further comprise regulating an inner spatial temperature of the section of the panel along the circumferential plane.

4. The method of claim 1, wherein discharging the second sub-portion of the portion of the compressed fluid comprises distributing the second sub-portion via the plurality of second through-holes around the circumferential plane of the panel collectively covered by a plurality of first through-holes and the plurality of second through-holes, wherein the plurality of first through-holes is spaced apart from each other along the circumferential direction and arranged in the first row.

5. The method of claim 1, wherein the third row partially overlaps with the first row.

6. The method of claim 1, wherein one or more through-holes of the at least one first through-hole or the plurality of second through-holes is a circular through-hole.

7. The method of claim 1, wherein one or more through-holes of the at least one first through-hole or the plurality of second through-holes is a non-circular through-hole, wherein the non-circular through-hole comprises a major axis inclined at an angle relative to a longitudinal axis, and wherein the angle is in range from 20 degrees to 160 degrees.

8. The method of claim 1, wherein a circumferential distance between mutually adjacent through-holes of the plurality of second through-holes is greater than 0.08 inches, wherein an axial distance between the mutually adjacent through-holes of the plurality of second through-holes is greater than 0.08 inches, and wherein an axial distance between the at least one first through-hole and a mutually adjacent second through-hole of the plurality of second through-holes is greater than 0.08 inches.

9. The method of claim 1, wherein the panel comprises a plurality of first through-holes spaced apart from each other along the circumferential direction and arranged in the first row, wherein the plurality of first and second through-holes collectively cover the circumferential plane of the panel along the first, second, and third rows.

10. The method of claim 9, wherein a circumferential distance between mutually adjacent through-holes of the plurality of first through-holes is greater than 1.5 hydraulic diameter of a through-hole of the plurality of first through-holes.

11. The method of claim 9, wherein the compressor and the combustor are parts of a gas turbine engine.

12. A method for regulating jet wakes in a combustor, comprising:
directing a portion of a compressed fluid from a compressor into a passageway defined between a casing and a combustor liner of the combustor;
directing a combustion gas along an annular combustion zone defined by a panel of the combustor liner;
discharging a first sub-portion of the portion of the compressed fluid from the passageway into the annular combustion zone via at least one first through-hole to aid in further combustion of an unburned portion of the combustion gas,
wherein the at least one first through-hole is disposed on at least a section of the panel in a first row extending along a circumferential direction; and
discharging a second sub-portion of the portion of the compressed fluid from the passageway into the annular combustion zone via a plurality of second through-holes to distribute the second sub-portion around a circumferential plane of the section of the panel collectively covered by the at least one first through-hole and the plurality of second through-holes, and purging out the jet wakes,
wherein the plurality of second through-holes is disposed on the section of the panel, spaced apart from each other along an axial direction and the circumferential direction, and arranged adjacent to the at least one first through-hole, wherein the plurality of second through-holes comprises a first set of through-holes and a second set of through-holes, wherein the first set of through-holes is arranged in a second row and the second set of through-holes is arranged in a third row different from the second row, wherein the second and third rows extend along the circumferential direction, and wherein at least one of the second row or the third row partially overlaps with the first row.

13. A method for regulating jet wakes in a combustor, comprising:
directing a portion of a compressed fluid from a compressor into a passageway defined between a casing and a combustor liner of the combustor;
directing a combustion gas along an annular combustion zone defined by a panel of the combustor liner;
discharging a first sub-portion of the portion of the compressed fluid from the passageway into the annular combustion zone via at least one first through-hole to aid in further combustion of an unburned portion of the combustion gas,
wherein the at least one first through-hole is disposed on at least a section of the panel in a first row extending along a circumferential direction; and
discharging a second sub-portion of the portion of the compressed fluid from the passageway into the annular combustion zone via a plurality of second through-holes to distribute the second sub-portion around a circumferential plane of the section of the panel collectively covered by the at least one first through-hole and the plurality of second through-holes, and purging out the jet wakes,
wherein the plurality of second through-holes is disposed on the section of the panel, spaced apart from each other along an axial direction and the circumferential direction, and arranged adjacent to the at least one first through-hole, wherein the plurality of second through-holes comprises a first set of through-holes and a second set of through-holes, wherein the first set of through-holes is arranged in a second row and the second set of through-holes is arranged in a third row different from the second row, wherein the second and third rows extend along the circumferential direction, and wherein the panel comprises a plurality of first through-holes spaced apart from each other along the circumferential direction and arranged in the first row, wherein the plurality of first and second through-holes collectively cover the circumferential plane of the panel along the first, second, and third rows.

14. The method of claim 13, wherein a circumferential distance between mutually adjacent through-holes of the plurality of first through-holes is greater than 1.5 hydraulic diameter of a through-hole of the plurality of first through-holes.

15. The method of claim 13, wherein the compressor and the combustor are parts of a gas turbine engine.

* * * * *